Feb. 14, 1967  J. R. WARD  3,303,757
SLEEVE SEAL
Filed Sept. 23, 1965
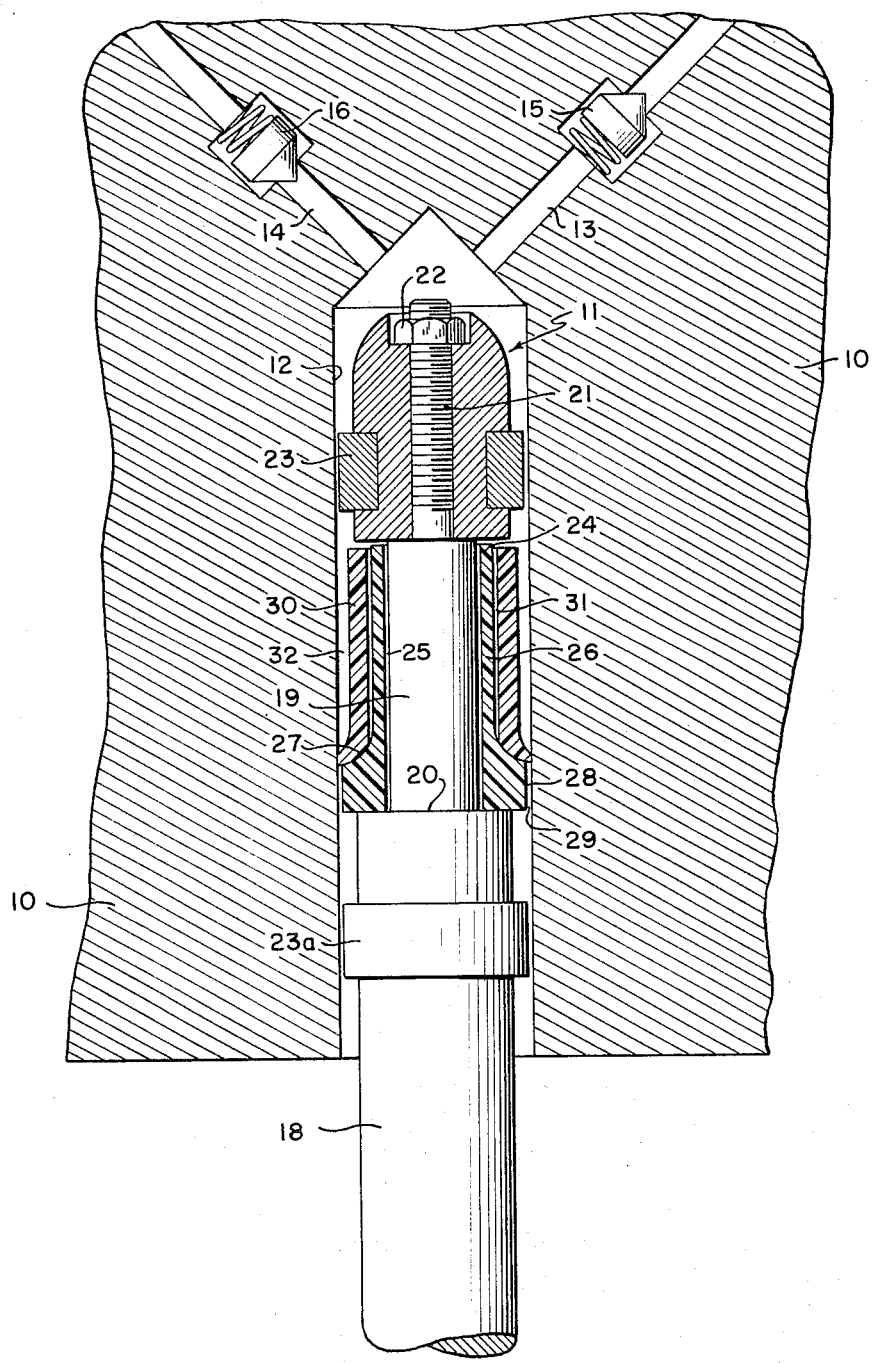
INVENTOR.
JOHN R. WARD
BY *Q. E. Hodges*
*Harvey A. David*
ATTYS.

United States Patent Office 3,303,757
Patented Feb. 14, 1967

3,303,757
SLEEVE SEAL
John R. Ward, Owings, Md., assignor to the United States of America as represented by the Secretary of the Navy
Filed Sept. 23, 1965, Ser. No. 489,771
9 Claims. (Cl. 92—201)

The invention described herein may be manufactured and used by or for the Government of the United States of America for governmental purposes without the payment of any royalties thereon or therefor.

This invention relates to seals and more particularly to an improved seal for pistons, shafts and the like operating under high pressure.

It is one object of this invention to provide a self lubricating or oil free seal suitable for use in high pressure compressors or the like.

It is another object of this invention to provide a seal which is durable and long lasting, and is self adjusting to compensate for such wear as does occur.

Another object of this invention is the provision of a seal of the foregoing character which is inexpensive to manufacture and does not require excessive attention to manufacturing tolerances.

Still another object of this invention is the provision of an improved seal for shafts, pistons and the like, which seal utilizes the sealed pressures to maintain an effective seal and yet imposes minimum frictional drag.

As another object this invention aims to accomplish the foregoing through the provision of a sleeve of sealing material, preferably a cold-flowable plastic such as tetrafluoroethylene including a wear resistant filler such as filamentary or particulate glass, the sleeve cooperating with a follower member having a curved surface which deforms one end of the sleeve into sealing engagement with a surface moving relative thereto or relative to which the seal moves.

Other objects and advantages of the invention will become apparent from the following description of a preferred embodiment thereof read in conjunction with the accompanying sheet of drawing wherein the sole figure is a sectional view of a seal embodying the invention shown in association with a portion of a compressor.

Referring now to the drawing, a seal embodying the invention will be described with reference to exemplary use with an air compressor comprising a cylinder member 10 and a piston 11. The cylinder member 10 has a bore 12 in which the piston 11 is reciprocable toward and from a high pressure zone which is served with inlet and outlet passages 13 and 14 and controlled by the valves 15 and 16.

The piston 11 is carried on a piston rod 18 having a reduced portion 19 defining an axially facing shoulder 20 and terminating in a threaded end portion 21 on which the piston 11 is threadedly engaged. A suitable lock nut 22 secures the piston 11 in its threaded condition on the end portion 21.

The piston 11 and the rod 18 are guided for reciprocatory movement in the bore 12 by rider rings 23 and 23a carried in suitable grooves in the piston and rod, respectively.

Disposed in the annular recess defined between the shoulder 20 and the piston 11, and in surrounding relation to the reduced portion 19, is an annular follower member 24. The follower member 24 is preferably formed of a rigid material such as epoxy or polyimide plastic materials, or carbon-graphite material and fits about the rod portion 19 with a clearance 25 which will permit it to be self centering in operation. Of course, the follower member 24 may be made of other plastics or metals which will remain relatively rigid under the operating temperatures and pressure to be encountered.

The follower member 24 is provided with a cylindrical surface 26 and an annular, curved surface 27 which slopes generally outwardly and away from the surface 26 and terminates in a cylindrical surface 28 at the end of the follower member remote from the high pressure end of the bore 12. The surface 28 of the follower member is spaced from the surface of the bore 12 by a clearance or annular space indicated at 29.

Surrounding the follower member 25, and between it and the surface of the bore 12, is a sealing sleeve 30. The sleeve 30, which is cylindrical throughout a major portion of its length, is of a size providing clearance 31 between it and the follower member and clearance 32 between the sleeve and the surface of the bore 12. It is to be noted at this point that the clearances, such as at 29, 31 and 32, are exaggerated in the drawing and are only as large as necessary to provide a substantially friction free sliding fit.

The end of the sleeve 30 which is remote from the high pressure end of the bore 12 is deformed outwardly by the surface 27 of the follower member into sealing engagement with the surface of the bore 12. It will be apparent that the sleeve 30 will be urged axially against the curved surface 27 by a force related to the pressure differential acting across the seal which is effected by the deformed end of the sleeve which bridges the clearance 29 between the follower member and the surface of the bore 12. This force causes the sleeve 30 to be urged axially along the follower member away from the high pressure so as to continuously compensate for wear of the sleeve 30 against the surface of the bore 12.

Inasmuch as the sleeve is provided with sufficient clearance at 26 and 32 to be substantially free of friction with the follower member, nearly all of the axial force on the sleeve is available to deform the sleeve along the curved surface 27 of the follower into sealing engagement with the bore surface 12. Moreover, the described construction avoids problems of maintaining a sealing relation between the cylindrical surface 25 of the follower and the sleeve 30.

Preferably the cylinder member 10 is formed of a metal or other material which is compatible with oil free operation of the sleeve thereagainst. In this regard it has been determined that a cylinder member 10 formed of 1040 low carbon steel, with the surface of the bore 12 being plated with dense chromium plating, will result in a notably small amount of wear in the sleeve 30 when the latter is formed of the mentioned glass filled tetrafluoroethylene.

From the foregoing detailed description it will be recognized that there has been provided by this invention an improved oil free seal for pistons, shafts, and the like, which satisfies the previously stated objects and advantages as well as others apparent from this description.

Of course many modifications, variations and uses of the present invention are possible in the light of the above teachings. It is therefore to be understood that within the scope of the appended claims the invention may be practiced otherwise than as specifically described.

What is claimed is:

1. A seal comprising:
    first and second members disposed for relative movement and defining a high pressure zone therebetween;
    one of said member presenting a first cylindrical surface toward the other of said members;
    said other member having an annular recess defined between axially facing shoulders;
    an annular member disposed in said recess of said other member and having a second cylindrical surface spaced a first distance from said first cylindrical surface, said annular member having a curved surface extending from said second cylindrical surface toward said first cylindrical surface and terminating at a third cylindrical surface forming part of said annular member and spaced from said first cylindrical surface a lesser distance than said first distance, said third cylindrical surface being at an end of said annular member remote from said high pressure zone; and an annular deformable sleeve comprising a cylindrical portion disposed in the space between said first and second cylindrical surfaces and having clearance with respect to each, said sleeve comprising an end portion engaging said curved surface and deformed thereby into sealing engagement with said first cylindrical surface, said sleeve bridging the space between said third cylindrical surface and said first cylindrical surface and thereby being urged by pressure from said high pressure zone axially away from said zone and along said zone and along said curved surface to maintain said sealing engagement.

2. A seal comprising:

a first member having a cylindrical bore;

a second member disposed for axial reciprocating movement in said bore toward and from a high pressure zone;

one of said members having an annular recess defined between axially facing shoulders;

an annular member disposed in said recess of said one of said members and having a first cylindrical surface spaced a first distance from the other of said members, said annular member having a curved surface extending from said cylindrical surface toward said other of said members and terminating at a second cylindrical surface of said annular member spaced from said other of said members a lesser distance than said first distance, said second cylindrical surface being at the end of said annular member remote from said high pressure zone; and an annular, deformable sleeve comprising a cylindrical portion disposed in the space between said first cylindrical surface and said other of said members and having clearance with respect to each, said sleeve comprising an end portion engaging said curved surface and deformed thereby into sealing engagement with said other of said members, said sleeve bridging the space between said second cylindrical surface and said other of said members and thereby being urged by pressure from said high pressure zone axially away from said zone and along said curved surface to maintain said sealing engagement.

3. A seal as defined in claim 2 and wherein said first member comprises a cylinder member and said second member comprises piston and rod means.

4. A seal as defined in claim 3 and wherein said one of said members is said piston and rod means.

5. A seal as defined in claim 2 and wherein said sleeve is formed of cold-flowable material.

6. A seal as defined in claim 5 and wherein said cold-flowable material comprises tetrafluoroethylene.

7. A seal of the character described comprising:

a cylinder member having a cylindrical bore;

a piston and piston rod disposed for axial reciprocating movement in said bore;

said piston and rod presenting axially facing shoulders defining an annular recess therebetween;

an annular member disposed in said recess and having a first cylindrical surface defining with said cylinder member a first annular space, said annular member having a curved surface extending outwardly from said first cylindrical surface toward said cylinder member and terminating at a second cylindrical surface of said annular member, said second cylindrical surface being at an end of said annular member remote from said high pressure zone and defining with said cylinder member a second annular space; and an annular sleeve of cold-flowable plastic material comprising a cylindrical portion disposed in said first annular space and having clearance with each of said first cylindrical surface and said cylinder member, said sleeve comprising an end portion engaging said curved surface and deformed outwardly thereby into sealing engagement with said cylinder member, said sleeve bridging said second annular space and thereby being urged by pressure of said high pressure zone axially away from said zone and along said curved surface to maintain said sealing engagement.

8. A seal as defined in claim 7 and wherein:

said plastic material comprises glass filled tetrafluoroethylene.

9. A seal as defined in claim 8 and wherein:

said bore of said cylinder member is defined by a dense chrome surface.

References Cited by the Examiner

UNITED STATES PATENTS 2,332,763  10/1943  Stewart _____ 92—183
2,565,701  8/1951  Stewart _____ 277—73 X EDGAR W. GEOGHEGAN, *Primary Examiner.*